(12) United States Patent
Hsiao et al.

(10) Patent No.: US 9,482,811 B2
(45) Date of Patent: Nov. 1, 2016

(54) BACKLIGHT MODULE AND LIQUID CRYSTAL DISPLAY DEVICE

(71) Applicant: Shenzhen China Star Optoelectronics Technology Co., Ltd., Shenzhen, Guangdong (CN)

(72) Inventors: Yuchun Hsiao, Shenzhen (CN); Chong Huang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 301 days.

(21) Appl. No.: 14/000,628

(22) PCT Filed: Jun. 25, 2013

(86) PCT No.: PCT/CN2013/077918
§ 371 (c)(1),
(2) Date: Aug. 21, 2013

(87) PCT Pub. No.: WO2014/172987
PCT Pub. Date: Oct. 30, 2014

(65) Prior Publication Data
US 2014/0313457 A1     Oct. 23, 2014

(30) Foreign Application Priority Data

Apr. 22, 2013   (CN) .......................... 2013 1 0140884

(51) Int. Cl.
*G02F 1/1335* (2006.01)
*G02F 1/1333* (2006.01)
*F21V 8/00* (2006.01)

(52) U.S. Cl.
CPC ........... *G02B 6/0088* (2013.01); *G02F 1/1336* (2013.01); *G02B 6/0023* (2013.01); *G02F1/133606* (2013.01); *G02F 2001/133317* (2013.01); *G02F 2201/503* (2013.01); *G02F 2201/54* (2013.01)

(58) Field of Classification Search
CPC .......... G02F 1/1336; G02F 1/133615; G02F 1/133308; G02F 1/133608; G02F 1/133606; G02F 2001/133317; G02F 2001/133308; G02F 2001/133314; G02F 2001/133322; G02F 2201/46; G02F 2201/503; G02F 2201/54; G02F 1/1626; G02F 2200/1612; G02B 6/0088; G02B 6/0023; G02B 6/0051; G02B 6/0086; G02B 6/0011; G02B 6/0081; G06F 1/1626; G06F 2200/1612; Y10S 345/905; Y10S 248/917
USPC ............. 349/65, 58, 60, 64, 62; 361/679.01, 361/679.26, 679.3, 679.55, 679.56; 362/615, 632, 633, 634, 97.1, 97.2, 362/97.4, 606; 345/905
See application file for complete search history.

(56) References Cited

U.S. PATENT DOCUMENTS

| 7,473,023 | B2 * | 1/2009 | Chun ................... G02B 6/0038 362/368 |
| 2009/0051846 | A1 * | 2/2009 | Horiuchi ............. G02B 6/0021 349/58 |
| 2010/0177124 | A1 * | 7/2010 | Ryu .................. G02F 1/133308 345/690 |

FOREIGN PATENT DOCUMENTS

| CN | 1746747 A | 3/2006 |
| CN | 202835051 U | 3/2013 |

OTHER PUBLICATIONS

English translation of Chinese Patent Publication No. CN202835051; translation generated by Google and obtained on Aug. 18, 2015.*
English translation of Chinese Patent Publication No. CN1746747; translation generated by WIPO and obtained on Aug. 18, 2015.*

* cited by examiner

*Primary Examiner* — Paisley L Arendt
*Assistant Examiner* — Angela Davison
(74) *Attorney, Agent, or Firm* — Andrew C. Cheng

(57) ABSTRACT

The invention provides a backlight module, including: an optical plate and an optical film, wherein at least one edge of optical film being disposed with a protruding ear, protruding ear having a via hole; backlight module further comprising at least a hanging element; wherein a side of the optical plate corresponding to edge of optical film with protruding ear being fixedly connected to hanging element; optical film being disposed on top of optical plate and via hole hanging on hanging element so as to fasten optical film. The backlight module improves the fix reliability of optical plate and prevents from arching up caused by thermal expansion. Because optical plate and optical film expand simultaneously due to heat, the wavy curve of the optical film is avoided and optical quality is improved. The present invention also discloses a liquid crystal display device with the backlight module.

20 Claims, 4 Drawing Sheets

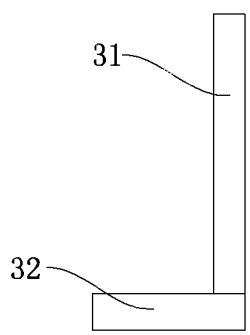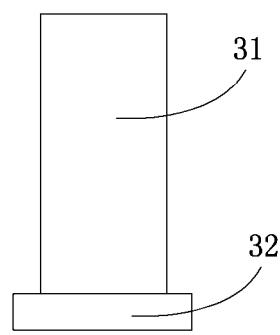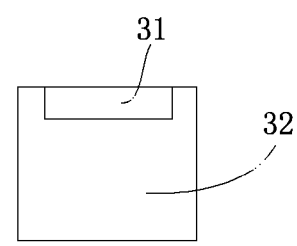
Figure 1A　　　　Figure 1B　　　　Figure 1C
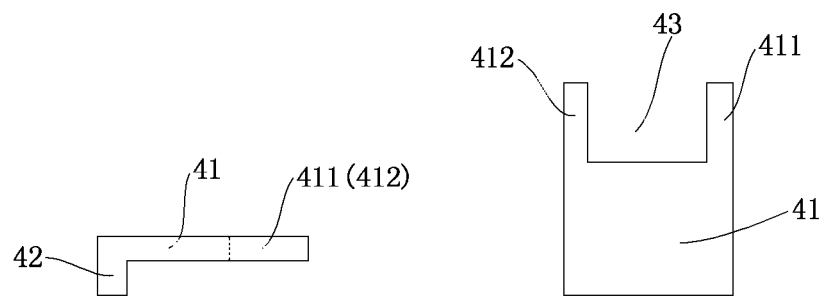
Figure 2A　　　　Figure 2B

BACKLIGHT MODULE AND LIQUID CRYSTAL DISPLAY DEVICE

BACKGROUND OF THE INVENTION

1. Field of the Invention

The present invention relates to the field of liquid crystal display techniques, and in particular to a backlight module and liquid crystal display device.

2. The Related Arts

A liquid crystal display device mainly comprises a backlight module and a liquid crystal display panel, wherein the liquid crystal display panel does not emit light; instead, the display light is provided by the backlight module for the liquid crystal display panel to display images.

In the liquid crystal display device using edge-type backlight module, the light-guiding plate uses concave trench to match the riveting pillars of the backboard to position for assembly. The optical film is positioned by the riveting pillars and is then adhered by the double-sided duck tape.

However, when performing the impact or vibration test on the liquid crystal display device, the positioning manner by using the riveting pillars of the backboard and concave trench of the light-guiding plate will cause the concave trench of the light-guiding plate to crack due to the overly concentrated applied force on the mouth of the concave trench of the light-guiding plate, which also restricts the thermal expansion of the light-guiding plate. With thermal expansion, the light-guiding plate may arch up to affect the optical quality of the liquid crystal display device. The use of double-sided suck tape to fasten the optical film also restricts the thermal expansion of the optical film. With thermal expansion, the optical film may show wavy curve, which also affects the optical quality of the liquid crystal display device. Similarly, the same problems exist in the liquid crystal display device using direct-type backlight module, with the problem happening to the diffuser, instead of the light-guiding plate.

SUMMARY OF THE INVENTION

To address the above issues in known technologies, the present invention provides a backlight module, which comprises an optical plate and an optical film, wherein at least one edge of the optical film being disposed with a protruding ear, the protruding ear having a via hole; the backlight module further comprising at least a hanging element; wherein the a side of the optical plate corresponding to the edge of the optical film with the protruding ear being fixedly connected to the hanging element; the optical film being disposed on top of the optical plate and the via hole hanging on the hanging element so as to fasten the optical film.

The present invention also provides a liquid crystal display device, which comprises: a backlight module and a liquid crystal display panel disposed opposite to the liquid crystal display panel, wherein the backlight module further comprising: an optical plate and an optical film, wherein at least one edge of the optical film being disposed with a protruding ear, the protruding ear having a via hole; the backlight module further comprising at least a hanging element; wherein the a side of the optical plate corresponding to the edge of the optical film with the protruding ear being fixedly connected to the hanging element; the optical film being disposed on top of the optical plate and the via hole hanging on the hanging element so as to fasten the optical film.

According to a preferred embodiment of the present invention, the backlight module further comprises a backboard and at least a stopping element; the hanging element is of an L-shape formed monolithically by a first board and a second board, with the second board having a width greater than the width of the first board; the stopping element is of an L-shape formed monolithically by a third board and a fourth board; wherein the fourth board is perpendicularly fixed to the backboard and forms a stopping space with the third board; the second board inserts into the stopping space so that the hanging element moves towards upper side of the backlight module with respect to the stopping element; and the first board is fixedly connected to a side of the optical board and hanging on the via hole of the protruding ear.

According to a preferred embodiment of the present invention, the two sides of the end of the third board extend outwards to form extending parts; the width of the second board is greater than the distance between the two extending parts; the first board is stopped between the two extending parts to restrict the hanging element from moving towards any side of the two sides neighboring the upper side of the backlight module.

According to a preferred embodiment of the present invention, one side of the optical plate is fixedly adhered to the hanging element; furthermore, one side of the optical plate is fixedly adhered to the hanging element by double-sided duct tape.

According to a preferred embodiment of the present invention, the hanging element is made of metal and the stopping element is made of plastic or rubber.

According to a preferred embodiment of the present invention, the optical plate is a light-guiding plate or a diffuser.

The backlight module and the liquid crystal display device of the present invention can improve the reliability of the fastening of the optical plate as well as prevent the optical plate from arching up due to thermal expansion. The present invention allows the optical plate and the optical film to expand and move simultaneously to avoid the wavy curve formed on the optical film so as to improve the optical quality of the backlight module.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings:

FIGS. 1A, 1B and 1C are side view, schematic view and top view showing the hanging element of the embodiment according to the present invention;

FIGS. 2A and 2B are side view and top view showing the stopping element of the embodiment according to the present invention;

DETAILED DESCRIPTION OF THE PREFERRED EMBODIMENTS

Figure 3:
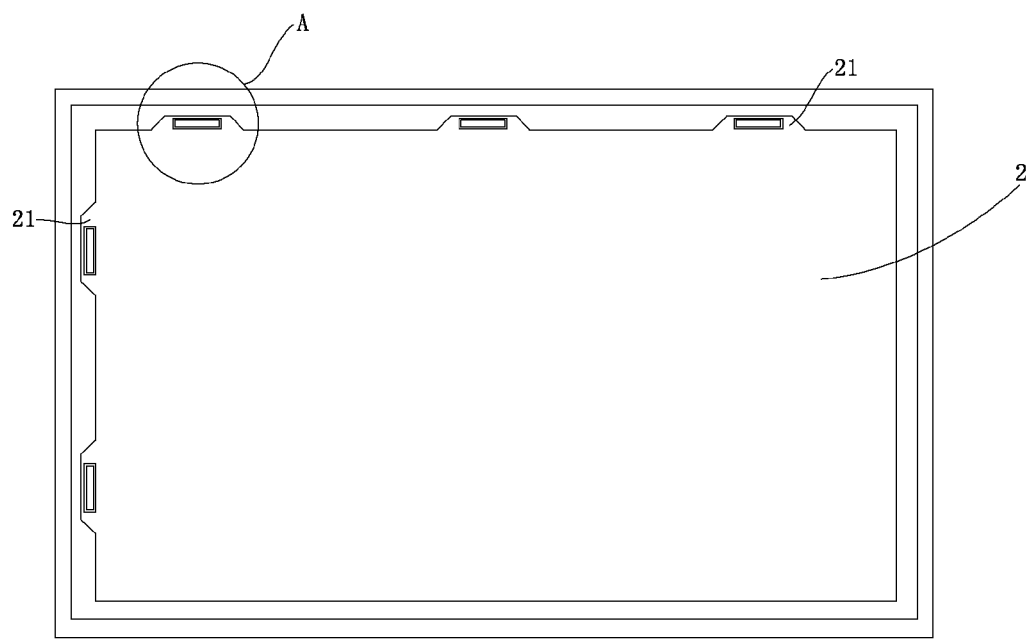
FIG. 3 is a schematic view showing the backlight module of the embodiment according to the present invention.

The following describes the embodiments of the present invention in details. The embodiments are depicted in the drawings, wherein the same number indicates the same part. The following refers to the drawings and embodiments for detailed description of the present invention. In the following, to prevent the unnecessary details of commonly known structures and/or functions from cluttering the concept of the present invention, the details of commonly known structures and/or functions are omitted.

FIGS. 1A, 1B and 1C are side view, schematic view and top view showing the hanging element of the embodiment according to the present invention.

As shown in FIGS. 1A, 1B and 1C, the hanging element 3 has an L-shape, which is monolithically formed by the first board 31 and the second board 32. The width of the second board 32 is greater than the width of the first board 31. The first board 31 is for fixedly connected to the optical plate and to position the optical film. In the present embodiment, the optical plate can be, such as, light-guiding plate. The function of the second board 32 will be described later. To enhance the reliability of the hanging element 3, a metal with higher rigidity can be used to manufacture the hanging element 3, such as, SECC, SGCC or AL5052 aluminum alloy. The choice of material is only illustrative, instead of restrictive.

FIG. 2A is a side view showing the stopping element of the embodiment according to the present invention, and FIG. 2B is a top view showing the stopping element of the embodiment according to the present invention.

As shown in FIGS. 2A and 2B, the stopping element 4 is also of an L-shape, monolithically formed by a third board 41 and a fourth board 42. The two sides of the end of the third board 41 extend outwards to form extending parts 411, 412, which further form concave trench 43. The width of the first board 31 of the hanging element 3 is equal to or slightly smaller than the distance between the extending parts 411, 412 so that the first board 31 can move with respect to the extending parts 411, 412. In the mean time, the width of the second board 32 of the hanging element 3 is greater than the distance between the two extending parts 411, 412, i.e., the width of the concave trench 43 to prevent the second board 32 from disengaging from the restriction when moving to the concave trench 43. For better resilience of the stopping element 4, the stopping element 4 can be made of plastic or rubber material.

FIG. 3 is a schematic view showing the backlight module of the embodiment according to the present invention.

The backlight module of the present embodiment is an edge-type backlight module. The backlight module of the present embodiment is disposed opposite to the liquid crystal display panel to form liquid crystal display device, wherein the backlight module provides the displaying light source to the liquid crystal display panel to display images.

As shown in FIG. 3, in actual application, the backlight module will be placed vertically in a landscape mode after assembled. The optical element, such as, optical film and light-guiding plate, will be gravitated to the lower side (i.e., the side of the vertically standing backlight module near the ground) due to own weight. Therefore, at least a fixing device must be disposed at the upper side (i.e., i.e., the side of the vertically standing backlight module away from the ground) to prevent the optical element gravitated towards the lower side of the backlight module. As a result, the backlight module of the present embodiment of the invention, three sets of combination of aforementioned hanging element 3 and stopping element 4 are disposed at the upper side of the backlight module to position and fix the optical film 2 and the light-guiding plate (not shown) underneath the optical film 2. Correspondingly, the side of the optical film 2 corresponding to the upper side of the backlight module is disposed with three protruding ears 21.

It should be noted that, in the present invention, the number of the combination sets of hanging elements 3 and stopping element 4 disposed at the upper side of the backlight module is not restricted to any specific number, as shown in FIG. 3. In addition, the number of protruding ears 21 disposed at the side of the optical film 2 corresponding to the upper side of the backlight module corresponds to the number of the combination sets of hanging elements 3 and stopping element 4 disposed at the upper side of the backlight module, and is not restricted to the embodiment in FIG. 3. Also, the upper side and the lower side of the backlight module are defined in accordance with the standing position of the backlight module, and the definition is not restrictive.

Furthermore, for super-size liquid crystal display device, the liquid backlight module can also be placed standing vertically in a portrait mode besides the landscape mode (i.e., 90° rotation from the landscape mode). Hence, any one side neighboring the upper side can also be disposed with at least a fixing device for fixing the optical element. As such, in the present embodiment, two combination sets of the hanging elements 3 and stopping element 4 are disposed at any one side neighboring the upper side of the backlight module so as to position and fix the optical film 2 and the light-guiding plate (not shown) underneath the optical film 2 when the backlight module stands vertically in the portrait mode. Correspondingly, the side of the optical film 2 corresponding to the any one side neighboring the upper side of the backlight module is disposed with two protruding ears 21. It should be noted that, in the present invention, the number of the combination sets of hanging elements 3 and stopping element 4 disposed at the any one side neighboring the upper side of the backlight module is not restricted to any specific number, as shown in FIG. 3. In addition, the number of protruding ears 21 disposed at the side of the optical film 2 corresponding to the any one side neighboring the upper side of the backlight module corresponds to the number of the combination sets of hanging elements 3 and stopping element 4 disposed at the any one side neighboring the upper side of the backlight module, and is not restricted to the embodiment in FIG. 3.

The following will describe in details the use of the hanging element and the stopping element to position and fix the optical film and the light-guiding plate according to the embodiment of the backlight module of the present invention. For the convenience of description, only one location on the backlight module using the hanging element and the stopping element will be described to avoid repetition.

Figure 4A:
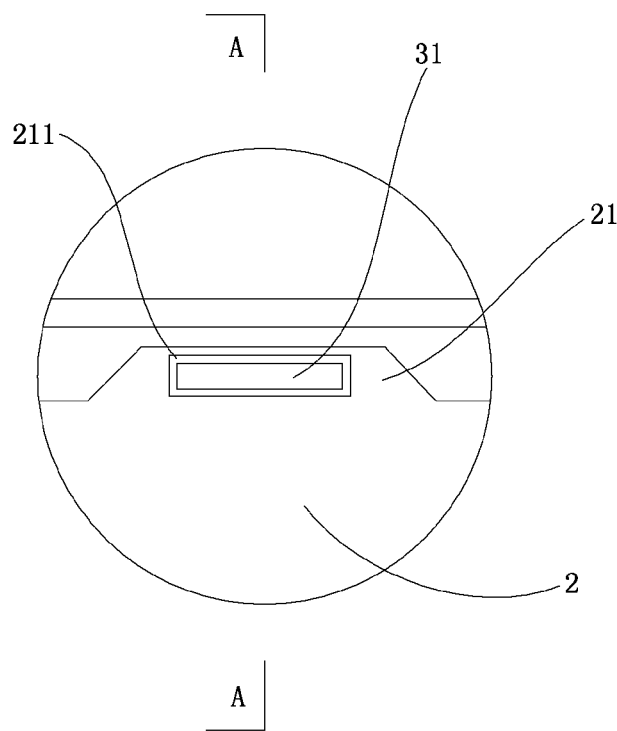
FIG. 4A is an enlarged view of region A of FIG. 3.
Figure 4B:
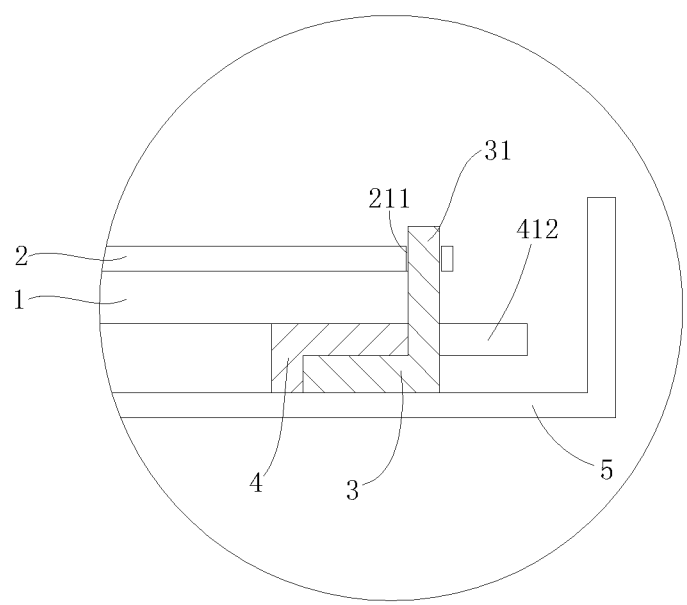
FIG. 4B is a cross-sectional view along A-A of FIG. 4A.

FIG. 4A is an enlarged view of region A of FIG. 3; and FIG. 4B is a cross-sectional view along A-A of FIG. 4A.

As shown in FIGS. 4A and 4B, the backlight module of the present embodiment includes a light-guiding plate 1, an optical film 2, a hanging element 3, a stopping element 4 and a backplane 5.

One end of the fourth board 42 of the stopping element 4 is perpendicularly fixed to the backplane 5, and the third board 41 of the stopping element 4 is disposed in parallel with the backplane 5 and keeps a fixed distance from the backplane 5. As such, the third board 41 and the fourth board 42 of the stopping element 4 and the backplane 5 form a stopping space with an opening.

The second board 32 of the hanging element 3 is disposed in parallel with the backplane 5 and inserts into the stopping space with the opening so that the hanging element 3 and the stopping element 4 are tightly assembled. In addition, the size of the second board 32 matches the size of the stopping space with the opening, and is able to enter and leave the stopping space with the opening. As such, the first board 31 of the hanging element 3 is perpendicularly standing in a landscape mode on the backplane 5 and is disposed in the concave trench 43 of the stopping element 4 so that the long board of the hanging element 3 is stopped between the two extending parts 411, 412, which will be described later.

The light-guiding plate 1 is disposed on top of the third board 41 of the stopping element 4 so that one side of the light-guiding plate 1 is fixedly connected to the third board 41. The topical film 2 is disposed on top of the light-guiding plate 1 and the protruding ear 21 is disposed with via hole 211, hanging on the first board 31 of the hanging element 3 so that the optical film 2 is fixedly positioned. As such, the light-guiding plate 1 and the optical film 2 are both fixedly connected to the first board 31 of the hanging element 3.

One side of the light-guiding plate 1 can be fixedly connected to the third board 41 by double-sided duct tape, and can also be adhered together by other means. No specific restriction is imposed by the present invention.

Figure 5:
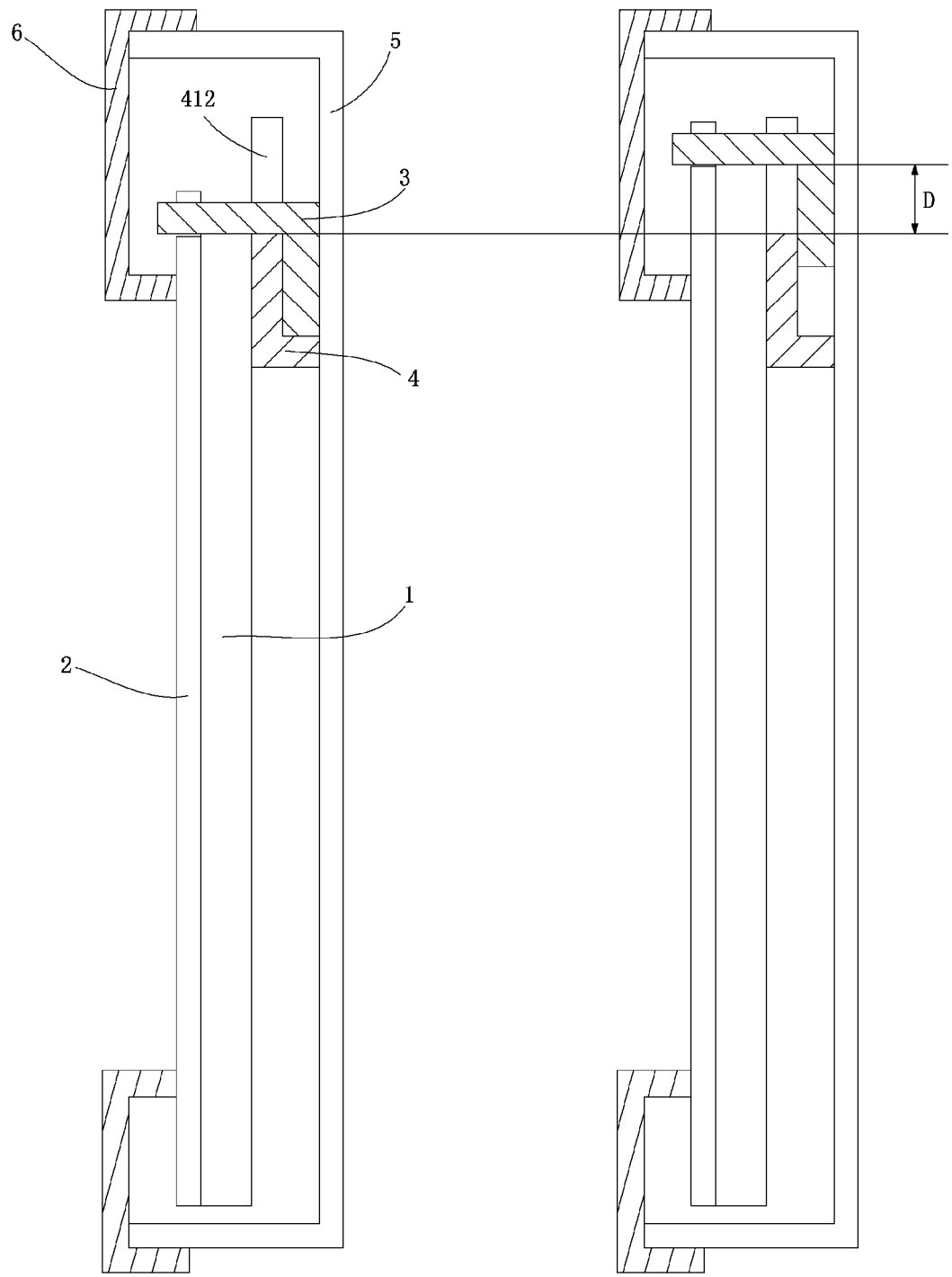
FIG. 5 is a status view showing the backlight module before and after thermal expansion according to the embodiment of the present invention.

FIG. 5 is a status view showing the backlight module before and after thermal expansion according to the embodiment of the present invention, wherein the left figure of FIG. 5 is a status view showing the backlight module before thermal expansion according to the embodiment of the present invention, and the right figure of FIG. 5 is a status view showing the backlight module after thermal expansion according to the embodiment of the present invention.

As shown in FIG. 5, when the light-guiding plate 1 expands due to thermal effect and moves towards the upper side of the backlight module, the expansion movement distance is D. The light-guiding plate 1 will push the hanging element 3 to move toward upper side with respect to the stopping element 4. Because the light-guiding plate 1 and the optical film 2 are both fixedly connected to the first board 31 of the hanging element 3, the light-guiding plate 1 will also cause the optical film 2 to move toward the upper side. As such, the light-guiding plate 1 is prevented from arching up due to the thermal expansion and the possible wavy curve of the optical film 2 is also prevented. In the mean time, the extending parts 411, 412 of the stopping element 4 restrict the hanging element 3 from moving toward any one side neighboring the upper side and prevent the hanging element 3 from moving side way and disengaging the assembly with the stopping element 4. In addition, because the distance between the extending parts 411, 412 is less than the width of the second board 32 of the hanging element 3, the second board 32 of the hanging element 3 will not disengage from the restriction of the stopping element 4 even when moving to between the extending parts 411, 412.

Besides, the optical film 2 will move towards the lower side due to the gravity and the distance of movement toward the lower side can compensate the distance D of movement toward the upper side caused by the light-guiding plate 1 and prevent the optical film 2 from escaping the press of the mod frame 6 at the lower side.

It should be noted that the stopping element 4 can be optional and only the hanging element 3 is used to fix the light-guiding plate 1 and the optical film 2 and ensures that the light-guiding plate 1 will move the optical film 2 together when moving due to thermal expansion. However, the hanging element 3 under the upward push by the light-guiding plate 1 and the gravity by the optical film 2 is prone to cause the double-sided duct tape at the fixed connection between the light-guiding plate 1 and the hanging element 3 to become loose, resulting in unreliable adherence. Therefore, the use of the stopping element 4 to apply a balancing force to the second board 32 of the hanging element 3 can avoid the loosening of the double-sided duct tape and enhance the connection reliability. Also, the extending parts 411, 412 of the stopping element 4 can restrict the hanging element 3 to move side way to disengage from the assembly with the stopping element 4.

In addition, it should be noted that to avoid repetition of description, the above description includes only the explanation to the edge-type backlight module. But the present invention is also applicable to the direct-type backlight module. By replace the light-guiding plate with a diffuser, the above hanging element and the stopping element assembly can also be used to position and fix the optical film and the diffuser.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A backlight module, which comprises an optical plate and an optical film, wherein at least one edge of the optical film being disposed with a protruding ear, the protruding ear having a via hole; the backlight module further comprising at least a hanging element; wherein a side of the optical plate corresponding to the at least one edge of the optical film with the protruding ear is directly contacted with the hanging element; the optical film is disposed on top of the optical plate, and the hanging element is inserted through the via hole so as to fasten the optical film.

2. The backlight module as claimed in claim 1, wherein the backlight module further comprises a backboard and at least a stopping element; the hanging element is of an L-shape formed monolithically by a first board and a second board, with the second board having a width greater than a width of the first board; the stopping element is of an L-shape formed monolithically by a third board and a fourth board; wherein the fourth board is perpendicularly fixed to the backboard and forms a stopping space with the third board; the second board is inserted into the stopping space so that the hanging element moves towards an upper side of the backlight module with respect to the stopping element in response to an expansion of the optical film and of the optical plate upon being subjected to a heat source; and the first board is fixedly connected to the side of the optical plate and is extended through the via hole of the protruding ear.

3. The backlight module as claimed in claim 2, wherein two sides of an end of the third board extend outwards to form two extending parts; the width of the second board is greater than the distance between the two extending parts; the first board is stopped between the two extending parts to restrict the hanging element from moving towards any side of the two sides neighboring the upper side of the backlight module.

4. The backlight module as claimed in claim 3, wherein one side of the optical plate is fixedly adhered to the hanging element.

5. The backlight module as claimed in claim 4, wherein one side of the optical plate is fixedly adhered to the hanging element by double-sided duct tape.

6. The backlight module as claimed in claim 2, wherein the side of the optical plate is fixedly adhered to the hanging element.

7. The backlight module as claimed in claim 2, wherein the hanging element is made of metal and the stopping element is made of plastic.

8. The backlight module as claimed in claim 2, wherein the hanging element is made of metal and the stopping element is made of rubber.

9. The backlight module as claimed in claim 1, wherein the optical plate is a light-guiding plate.

10. The backlight module as claimed in claim 1, wherein the optical plate is a diffuser.

11. A liquid crystal display device, which comprises: a backlight module and a liquid crystal display panel disposed opposite to the backlight module, wherein the backlight module further comprising: an optical plate and an optical film, wherein at least one edge of the optical film being disposed with a protruding ear, the protruding ear having a via hole; the backlight module further comprising at least a hanging element; wherein a side of the optical plate corresponding to the at least one edge of the optical film with the protruding ear is directly contacted with the hanging element; the optical film is disposed on top of the optical plate, and the hanging element is inserted through the via hole so as to fasten the optical film.

12. The liquid crystal display device as claimed in claim 11, wherein the backlight module further comprises a backboard and at least a stopping element; the hanging element is of an L-shape formed monolithically by a first board and a second board, with the second board having a width greater than a width of the first board; the stopping element is of an L-shape formed monolithically by a third board and a fourth board; wherein the fourth board is perpendicularly fixed to the backboard and forms a stopping space with the third board; the second board is inserted into the stopping space so that the hanging element moves towards an upper side of the backlight module with respect to the stopping element in response to an expansion of the optical film and of the optical plate upon being subjected to a heat source; and the first board is fixedly connected to the side of the optical plate and is extended through the via hole of the protruding ear.

13. The liquid crystal display device as claimed in claim 12, wherein two sides of an end of the third board extend outwards to form two extending parts; the width of the second board is greater than the distance between the two extending parts; the first board is stopped between the two extending parts to restrict the hanging element from moving towards any side of the two sides neighboring the upper side of the backlight module.

14. The liquid crystal display device as claimed in claim 13, wherein one side of the optical plate is fixedly adhered to the hanging element.

15. The liquid crystal display device as claimed in claim 14, wherein one side of the optical plate is fixedly adhered to the hanging element by double-sided duct tape.

16. The liquid crystal display device as claimed in claim 12, wherein the side of the optical plate is fixedly adhered to the hanging element.

17. The liquid crystal display device as claimed in claim 12, wherein the hanging element is made of metal and the stopping element is made of plastic.

18. The liquid crystal display device as claimed in claim 12, wherein the hanging element is made of metal and the stopping element is made of rubber.

19. The liquid crystal display device as claimed in claim 11, wherein the optical plate is a light-guiding plate.

20. The liquid crystal display device as claimed in claim 11, wherein the optical plate is a diffuser.

* * * * *